(No Model.) 2 Sheets—Sheet 1.
E. & J. DELPLACE.
APPARATUS FOR MAKING SULPHURIC ACID.
No. 446,060. Patented Feb. 10, 1891.
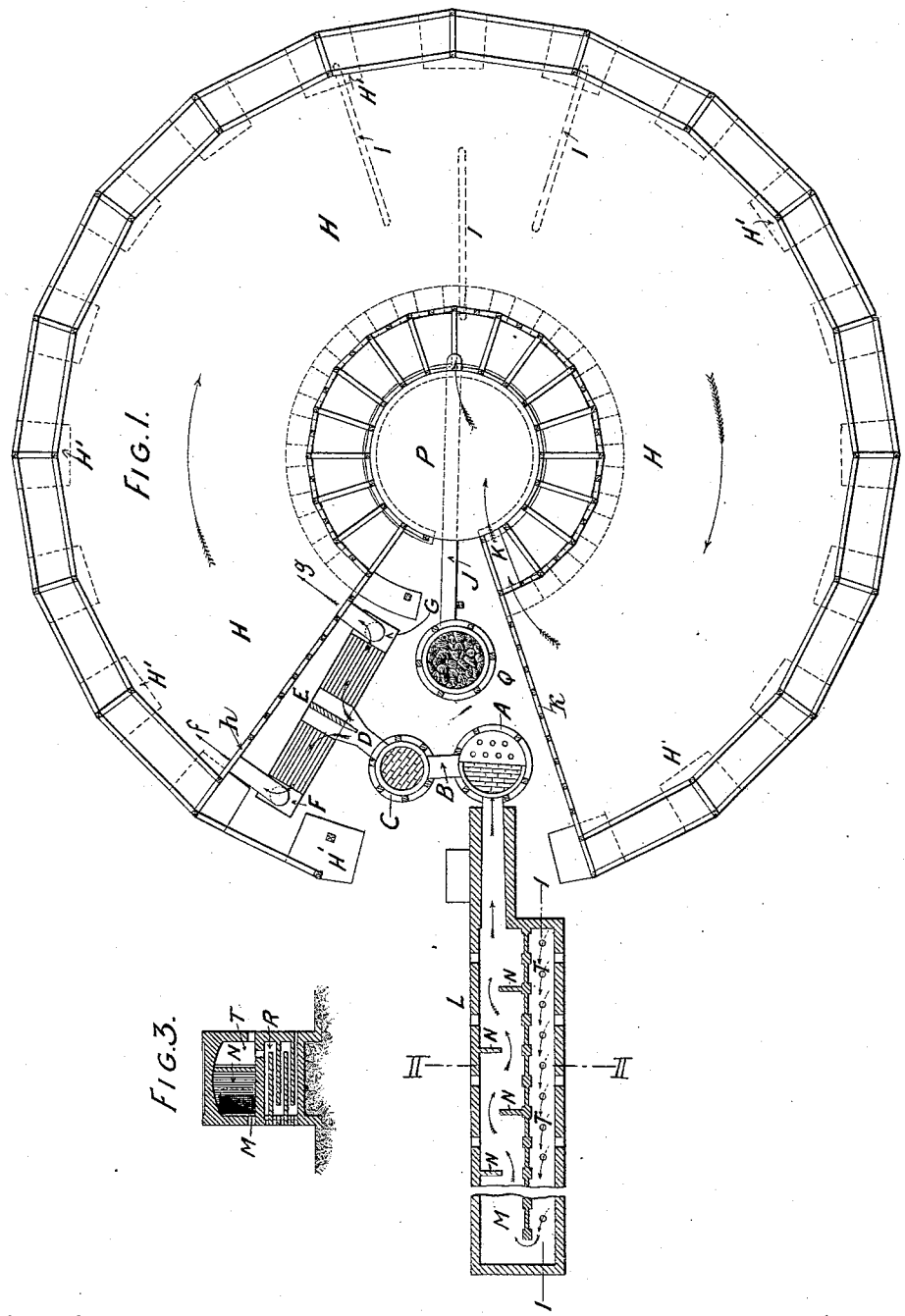
WITNESSES:
INVENTORS:
Emile Delplace
Jules Delplace
by Fairfax & Wetter
    Attorneys (No Model.) 2 Sheets—Sheet 2.
E. & J. DELPLACE.
APPARATUS FOR MAKING SULPHURIC ACID.
No. 446,060. Patented Feb. 10, 1891.
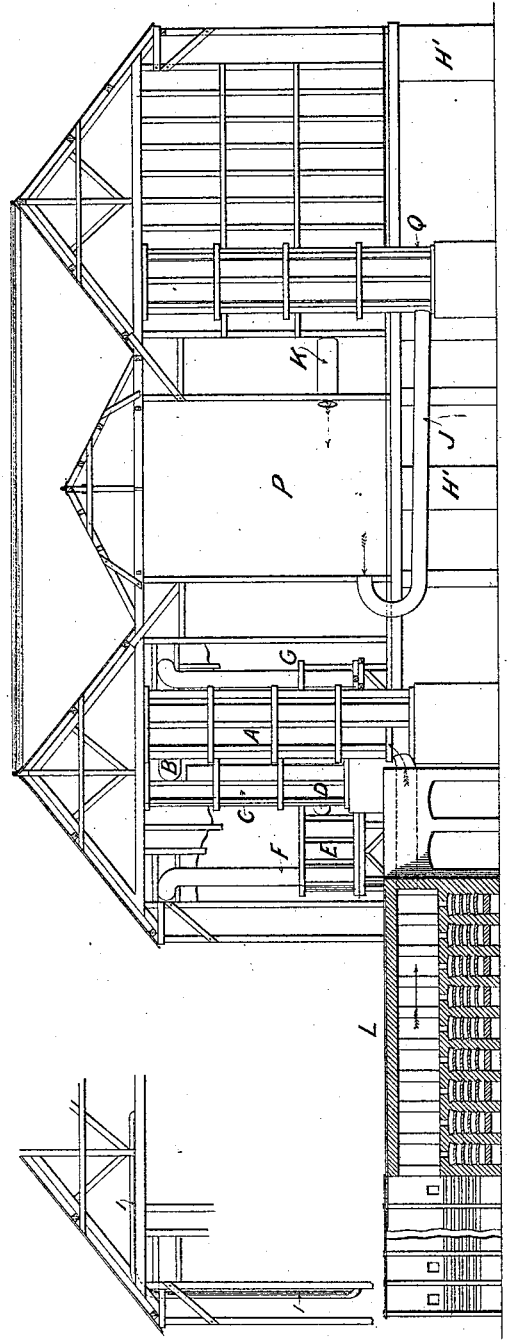
WITNESSES.
INVENTORS:
Emile Delplace
Jules Delplace
by Fairfax & Wetter
Attorneys

UNITED STATES PATENT OFFICE.

EMILE DELPLACE AND JULES DELPLACE, OF AUBERVILLIERS, FRANCE.

APPARATUS FOR MAKING SULPHURIC ACID.

SPECIFICATION forming part of Letters Patent No. 446,060, dated February 10, 1891.

Application filed May 5, 1890. Serial No. 350,621. (No model.) Patented in France March 22, 1890, No. 204,462.

*To all whom it may concern:*

Be it known that we, EMILE DELPLACE and JULES DELPLACE, citizens of the French Republic, residing at Aubervilliers, in France, have invented certain new and useful Improvements in Apparatus for the Manufacture of Sulphuric Acid, (for which we have obtained Letters Patent in France, dated March 22, 1890, and numbered 204,462,) of which the following is a full, clear, and exact specification.

Our improvements in apparatus for the manufacture of sulphuric acid relate more particularly to the leaden chambers and to certain auxiliary appliances.

Instead of giving to the leaden chamber the shape of a more or less elongated parallelopiped through which the gases travel in parallel layers, and therefore require much time to form the required mixture, we force the gases to take a curved or circuitous path by giving to the leaden chamber an annular shape. The inner and outer circumference of the chamber or of its horizontal cross-section may form a circle, a semicircle, an oval, a polygon, a spiral, or any other suitable figure. The floor of the chamber may be situated in a plane, or it may be inclined so as to form a helical or other suitable surface.

In the following description reference will be made to the accompanying drawings, in which—

Figure 1 is a horizontal and Fig. 2 a vertical section of a sulphuric-acid plant embodying our invention. Fig. 2$^a$ is a detail drawing hereinafter more fully described. Fig. 3 is a cross-section of the pyrites-burners along line I II of Fig. 1.

The said plant comprises two leaden chambers, the first chamber H forming a polygonal ring, with the exception of a sector, which is left open for the reception of auxiliary apparatus, such as the concentrating-column A, the denitrifying-column C, and the dividing-chamber E, while the second leaden chamber P occupies the center of the said ring. The left half of Fig. 2 is a section through the pyrites-burners along line I of Fig. 1 and a section through the open sector of the leaden chamber looking toward the front wall $h$, so as to show the auxiliary apparatus A, C, and E, while the right half of Fig. 2 is a section through the open sector looking toward the end wall $k$, so as to show the Gay-Lussac or absorption tower Q. The gases are admitted at the top of the radial front wall or partition $h$ through a pair of openings $f$ and $g$, one being near the circumference and the other near the inner wall of the annular chamber H. The molecules which at one moment are nearest the center are shortly afterward nearest to the circumference, and vice versa. The mutual contact, friction, and shifting of molecules is continual. The molecules of sulphurous acid meet at every moment molecules of water and of oxidizing-matter, thus producing an intimate combination.

Let us consider three molecules—namely, one of sulphurous acid, the second of nitrous acid, and the third of aqueous vapor—which are necessary for the production of sulphuric acid by the usual method. As long as they are not simultaneously in contact the desired chemical combination will not take place. In a rectangular chamber they may travel side by side from one end of the chamber to the other without ever coming simultaneously into contact. In our apparatus this defect is avoided by the constant changes of the direction of the gases traveling through the chamber, which produce forced contacts.

It is found in practice that the temperature and pressure of the gases near the ceiling are generally greater than at the bottom. In order to equalize the pressure, we connect the roof or upper part of the chamber with the bottom at suitable intervals by means of distributing-pipes I, which receive a portion of the high-pressure gases at the top of the chamber and conduct it along the outer or inner circumference down to the bottom.

Fig. 1 indicates by dotted lines three distributing-pipes I, one of which leads down along the inner and two along the outer circumference of the leaden chamber. In the sectional view, Fig. 2$^a$, one of the outer tubes I is shown in elevation. From the leaden chamber H the gases may pass either directly to the Gay-Lussac or absorption tower, or, as shown by the drawings, they may be led through a radial pipe K into a supplementary leaden chamber P, which occupies the inside of the annular chamber H, and which serves to combine the last remnants of gases before they are introduced into the denitrifying-tower Q through the pipe J. The leaden chambers are provided with the usual lining of lead. (Not shown in the drawings.) The drawings only show the wooden frame-work and roof or the skeleton of the leaden chamber, as well as the masonry or pillars H', which support the same. This method of construction may of course be modified without departing from the invention.

The pyrites-burners or kilns are placed in a row, as usual, each burner consisting of five superposed compartments or floors R, which communicate with each other and are provided with doors. Immediately over the pyrites-burners and extending the whole length of the row is situated on one side the collecting-channel T and on the other side the dust-flue or chamber M, which is separated from the collector by a vertical partition, and communicates with the latter at one end, as shown. The dust-flue M is provided with short partitions or deflecting-plates N, which force the fumes to take a zigzag course. The said fumes pass through openings provided in the roof of the uppermost compartments of the burners into the channel T, and thence through the dust-flue M into the concentrating-tower, as indicated by arrows.

Our improved sulphuric-acid plant also comprises the following auxiliary apparatus: A concentrating-tower A, which receives the sulphurous fumes directly from the pyrites-burners and utilizes their heat for concentrating the weak chamber acid to about 60° Baumé. This tower consists, chiefly, of a cylinder of sheet-lead, preferably from six to ten millimeters thick, and filled with natural acid-proof stones—such as feldspar, trachyte, granite, porphyry, basalt, lava—instead of the silicious bricks hitherto employed for this purpose. The gases after having been cooled down in the tower A pass through the canal B into the denitrifying-column C, which contains several layers of stoneware tubes or acid-proof stones like the tower A, in order to multiply the points of contact. This column has for its object to complete the denitrification of the sulphuric acid and to decompose the quantity of nitric acid necessary for the oxidation of the sulphurous acid. The gases enter the column C at the top and escape at the bottom. By these means we prevent the decomposition of the nitrous products, which takes place in ordinary installations with a single Glover's tower, owing to an excess of sulphurous-acid gas and a high temperature. From the denitrifying-column C the gases pass into a collector D, which contains a central partition dividing them into two equal portions, after which the gases enter a dividing-chamber E in the middle of its length, which chamber contains parallel tubes or acid-proof stones adapted to subdivide the gaseous products. The gases thus reach the two opposite ends of the dividing-chamber and enter the two pipes F and G, which conduct them to the large leaden chamber H, described above.

Q is a Gay-Lussac tower, into which the gases pass from the leaden chambers for denitrification.

What we claim as our invention, and wish to secure by Letters Patent, is—

1. In apparatus for the manufacture of sulphuric acid, an annular leaden chamber provided with two gas-inlets at unequal distances from the center or axis of the chamber, substantially as described, and for the purposes specified.

2. In apparatus for the manufacture of sulphuric acid, a leaden chamber having the shape of a circular ring with a sector cut out, the said chamber being provided at one end with two gas-inlets at unequal distances from the center and at the other end with a gas-outlet, substantially as described, and for the purposes specified.

3. In apparatus for the manufacture of sulphuric acid, an annular leaden chamber provided with distributing-pipes leading from the upper part to the lower part of the chamber along the inner or outer wall, substantially as described, and for the purposes specified.

4. In apparatus for the manufacture of sulphuric acid, the combination of annular leaden chamber H with concentrating-tower A, denitrifying-column C, collector D, and directing-chamber E, substantially as described.

In testimony whereof we have signed this specification in the presence of two subscribing witnesses.

EM. DELPLACE.
J. DELPLACE.

Witnesses:
  M. DEMUZENEY,
  ALBERT RICHET.